US010786912B2

(12) United States Patent
Flores et al.

(10) Patent No.: US 10,786,912 B2
(45) Date of Patent: Sep. 29, 2020

(54) CUTTING TOOL WITH MAGNIFIER

(71) Applicant: West Coast Chain Mfg. Co., Ontario, CA (US)

(72) Inventors: Jesus Flores, Moreno Valley, CA (US); Andrew Castaneda, Anaheim, CA (US); Edwin S. Fung, Walnut, CA (US)

(73) Assignee: West Coast Chain Mfg. Co., Ontario, CA (US)

(*) Notice: Subject to any disclaimer, the term of this patent is extended or adjusted under 35 U.S.C. 154(b) by 203 days.

(21) Appl. No.: 16/028,866

(22) Filed: Jul. 6, 2018

(65) Prior Publication Data
US 2020/0009751 A1  Jan. 9, 2020

(51) Int. Cl.
| | | |
|---|---|---|
| B26B 13/22 | (2006.01) | |
| B25G 1/10 | (2006.01) | |
| A01K 91/04 | (2006.01) | |
| B26B 13/16 | (2006.01) | |
| A01K 85/08 | (2006.01) | |
| F16B 45/02 | (2006.01) | |

(52) U.S. Cl.
CPC .............. *B26B 13/22* (2013.01); *A01K 85/08* (2013.01); *A01K 91/04* (2013.01); *B25G 1/102* (2013.01); *B26B 13/16* (2013.01); *F16B 45/02* (2013.01)

(58) Field of Classification Search
CPC ......... B26B 13/22; B26B 13/16; A01K 85/08; A01K 91/04; B25G 1/102; F16B 45/02
USPC .......................... 359/809–812, 815, 817–819
See application file for complete search history.

(56) References Cited

U.S. PATENT DOCUMENTS

| | | | | |
|---|---|---|---|---|
| 3,516,306 A | * | 6/1970 | Muller .............. | B23B 29/03414 408/16 |
| 3,955,884 A | * | 5/1976 | Del Pesco, Sr. ..... | G02B 25/005 359/804 |
| 5,370,648 A | * | 12/1994 | Cracraft ................ | A61B 17/28 606/1 |
| 6,220,251 B1 | * | 4/2001 | Jeong .................... | A45D 29/04 132/73.5 |
| 6,476,984 B1 | * | 11/2002 | Ringdahl .............. | A45D 27/00 132/289 |

(Continued)

OTHER PUBLICATIONS

Webpage "Long SNIP Cheaters Fishing Line Cutter with Fly Trimming Magnifying Glass, Cuts 50 lb. Braided Fishing Line" https://www.boomerangtool.com/products/long-snip-cheaters (Year: 2020).*

*Primary Examiner* — George G King
(74) *Attorney, Agent, or Firm* — Lewis Roca Rothgerber Christie LLP

(57) ABSTRACT

In some embodiments, a magnifier defines a longitudinal axis A. The magnifier includes an arm with a distal end and a proximal end. A magnifying pane is located at the distal end and an engagement member is located at the proximal end. In various embodiments, the arm includes a distal segment, a mid segment, and a proximal segment. The distal segment is generally linear having a length L1 projected onto the longitudinal axis and is angled about 45 degrees relative to the longitudinal axis A. The mid segment is generally concave having a length L2 projected onto the longitudinal axis A. The proximal segment that is curved having a length L3 projected onto the longitudinal axis A and is convergent relative to the longitudinal axis A.

15 Claims, 11 Drawing Sheets

(56) References Cited

U.S. PATENT DOCUMENTS

| | | | |
|---|---|---|---|
| 9,289,905 B2 * | 3/2016 | Cornell | B26B 13/005 |
| 2005/0203546 A1 * | 9/2005 | Van Wyk | A61B 17/0467 |
| | | | 606/138 |

* cited by examiner

CUTTING TOOL WITH MAGNIFIER

BACKGROUND

1. Field

Some embodiments of the present disclosure relate generally to a cutting tool.

2. Description of the Related Art

Sport fishing is a sport enjoyed by anglers around the world. Most forms of sport fishing include the use of a rod, a line, a lure, and a hook. While many forms of fishing are relatively easy for a newcomer to attempt. Some forms of fishing require higher levels of skill, time, and practice to become accomplished.

Fly fishing is an angling method that uses flies that provoke fish to bite. A key element for successfully catching fish while fly fishing it to thoroughly disguise the hook and attached line with a "fly" that either imitates a natural food source of the local fish or otherwise catches the attention of the fish. Flies are often tied by hand and are often meticulously crafted with very fine details and may have a variety of colors, shapes, and sizes. It can take huge amounts of time, ranging from hours to days, to design and tie a single fly. Typically, flies are made by fastening natural or synthetic materials in a desired size and arrangement to the hook.

Anglers have a large variety of tools that they use in order to help with the tying of flies as well as a variety of tools that they carry with them to their fishing site. In order to use a fly, the fly must be attached to a line. The line is generally visible in nature, so to successfully fool a fish the line is attached to the fly using a leader and tippet. The leader attaches to the line and the tippet and is often relatively thick. The tippet is usually very thin, having a diameter as small as 0.003 inches, and is used to attach the fly to the leader. In order to attach the fly to the tippet, an angler must tie a knot. The knot should be precisely tied so as to not ruin the illusion of the fly. Any excess tippet should be trimmed to reduce the chances of a fish spotting the line.

For many fishermen, tying a fly to a tippet can represent a very difficult task. The various knots that may be utilized can be complicated to tie and the line should be arranged precisely to achieve the knot's desired shape. Furthermore, each knot is very small, making it both difficult to physically handle and difficult to see. Thus, fisherman often accomplish this challenging task on dry land prior to setting out on the water, typically at a workstation equipped with a standing magnifier or a headband magnifier that allows them to work freely with both hands. However, if the fly requires repair when the fisherman is on the water, a standing magnifier may not be available and some effort is needed to don a headband magnifier. Accordingly, a portable multi-purpose tool which provides a magnifier is desirable.

The above information is only for enhancement of understanding of the background of embodiments of the present disclosure, and therefore may contain information that does not form the prior art.

SUMMARY

Some embodiments of the present disclosure provide for a cutting tool magnifier for use in a variety of applications, including various tasks, projects and hobbies, including fly construction. In some embodiments, the cutting tool magnifier has a base, a hinge attached to the base, and an arm. The arm has a proximal end and a distal end. The arm is connected to a magnifying pane holder at a distal end and the hinge at a proximal end, wherein the arm is configured to follow the shape of a sidewall of a cutting tool. In various embodiments, the arm has a first segment, a second segment, and a third segment. The first segment at the distal end and extending from the magnifying pane holder at a front end of the cutting tool and angled about 45 degrees relative to a longitudinal axis A passing through the front end of the cutting tool and a back end of the cutting tool. The second segment extends from the first arm segment in a concave shape that curves inwards towards the longitudinal axis A. The third arm segment extending from the second arm segment and connecting to the hinge at the proximal end. In various embodiments, a magnifying pane is held by the magnifying pane holder.

In some embodiments, the hinge includes a knuckle attached to the third arm segment and a pin attached to the base.

In some embodiments, the knuckle includes a C-shaped bracket configured to removably accept the pin.

In some embodiments, the arm has a cutout in the second segment to accommodate a switch on the cutting tool.

In some embodiments, the magnifying pane holder comprises at least one magnifier clip configured to hold the magnifying pane in the magnifying pane holder.

In some embodiments, a center of the magnifying pane is bisected by the longitudinal axis A.

In some embodiments, the arm may articulate to different positions with an angle θ ranging between about 0 and 180 degrees wherein the angle θ is about 0 degrees when the arm rests on top of a top side of the cutting tool.

In some embodiments, the base is attached to a bottom side of the cutting tool.

In some embodiments, a magnifier is configured for releasable attachment to the cutting tool. The magnifier defines a longitudinal axis A. The magnifier includes an arm with a distal end and a proximal end. A magnifying pane is attached to the arm at the distal end and an engagement member is attached at the proximal end. The arm includes a distal segment, a mid segment, and a proximal segment. The distal segment is generally linear having a length L1 projected onto the longitudinal axis and is angled about 45 degrees relative to the longitudinal axis A. The mid segment is generally concave having a length L2 projected onto the longitudinal axis A. The proximal segment is curved having a length L3 projected onto the longitudinal axis A and is convergent relative to the longitudinal axis A.

In some embodiments, the length of the mid segment L2 is generally about twice the length of L1.

In some embodiments, the engagement member includes a female member configured for attachment to a male member formed on a housing of a cutting tool.

In some embodiments, the female member includes a C-shaped bracket.

In some embodiments, the engagement member is configured to provide rotation of the arm about an axis generally perpendicular to the longitudinal axis.

In some embodiments, the engagement member includes a male member configured for attachment to a female member formed on a housing of a cutting tool.

In some embodiments, the magnifier defines a longitudinal axis A. The magnifiers includes an arm with a distal end and a proximal end, a magnifying pane at the distal end, and an engagement member at the proximal end. The engagement member has a male member attached to a cutting tool and a female member attached to the proximal end. In some embodiments, the arm includes a distal segment, a mid segment, and a proximal segment. The distal segment is generally linear having a length L1 projected onto the longitudinal axis and is angled about 45 degrees relative to the longitudinal axis A. The mid segment is generally concave having a length L2 projected onto the longitudinal axis A. The proximal segment is curved having a length L3 projected onto the longitudinal axis A and is convergent relative to the longitudinal axis A.

In some embodiments, the female member includes a C-shaped bracket.

In some embodiments, the male member comprises a pin.

In some embodiments, the C-shaped bracket is configured to removably accept the pin.

In some embodiments, a center of the magnifying pane is bisected by the longitudinal axis A.

In some embodiments, the engagement member is configured to provide rotation of the arm about an axis generally perpendicular to the longitudinal axis.

BRIEF DESCRIPTION OF THE DRAWINGS

Some embodiments can be understood in more detail from the following description taken in conjunction with the accompanying drawings, in which.

DETAILED DESCRIPTION

Figure 1:
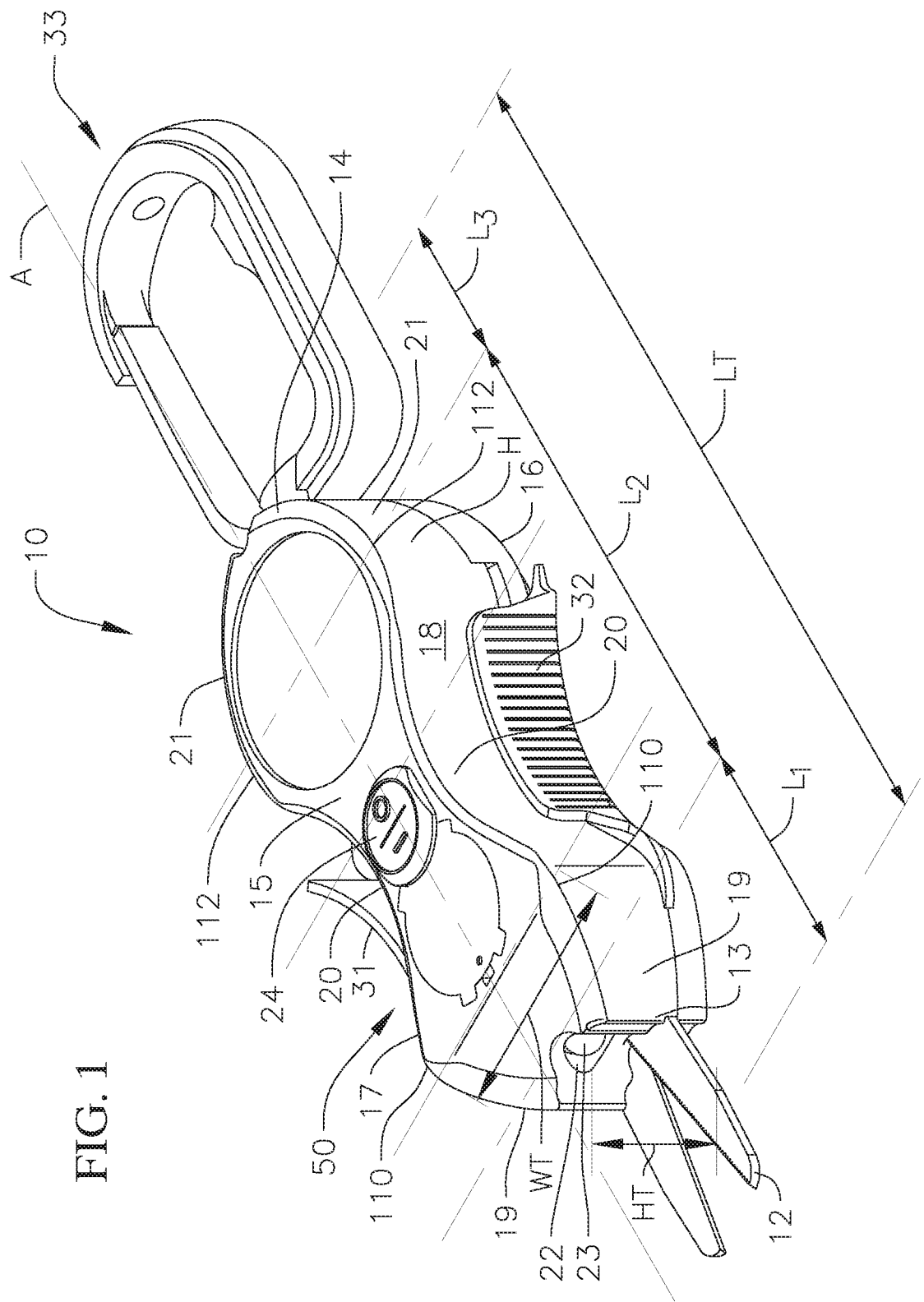
FIG. 1 depicts a cutting tool from a side perspective according to various embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. The drawings are not necessarily to scale and the relative sizes of elements, layers, and regions shown may be exaggerated for clarity.

Embodiments of the present disclosure include a magnifier, and a cutting tool with a magnifier. In various embodiments, the magnifier is attached to the cutting tool by an articulating arm that conforms to the shape of the cutting tool providing for a compact and ergonomic device. The articulating arm may pivot and lock in various positions, allowing the user to precisely position the magnifier without the use of their hands. The user may thus, freely use their hands while utilizing the magnifier and the cutting tool as need.

Figure 2:
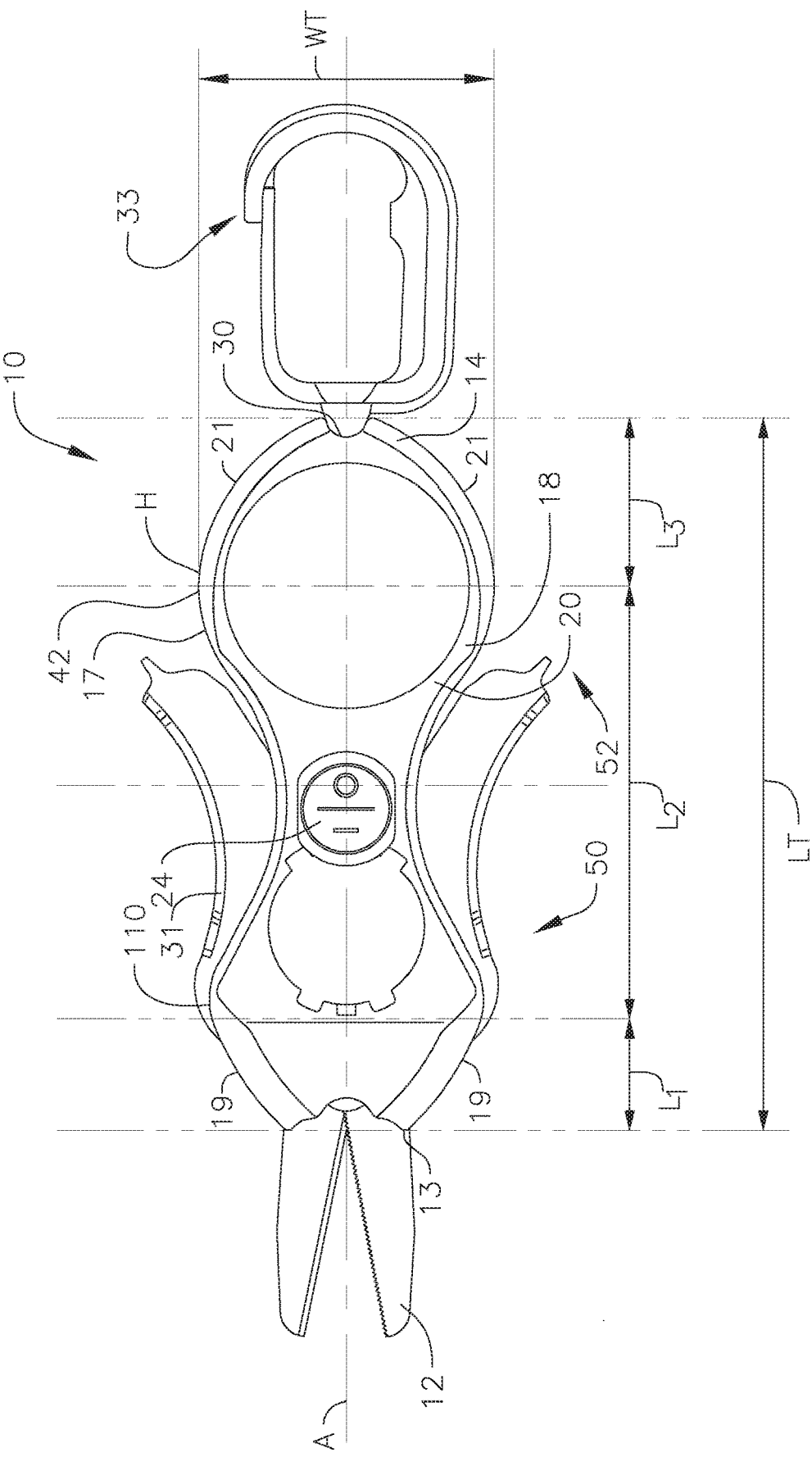
FIG. 2 depicts the cutting tool from a top perspective according to various embodiments of the present invention.

FIG. 1 and FIG. 2 depict a cutting tool 10 according to various embodiments of the present invention. In various embodiments, the cutting tool 10 has a housing H having a first or top side 15 and a second or bottom side 16 connected by two sidewalls 17, 18 generally perpendicular to the sides 15 and 16. The housing H is generally elongated along a longitudinal axis A along which an overall length LT extends between a first or front end 13 and a second or back end 14. The housing H also has an overall width WT generally transverse to the axis A, and an overall height HT. The cutting tool 10 has a pair of cutter blades 12 at the front end 13 and a retractable cable 30 at the back end. In various embodiments, the retractable cable 30 may be connected to an attachment mechanism 33 such as a carabiner, hook, ring, etc. The cutter blades 12 may be sized differently, or have different lengths and/or different shapes in different embodiments.

In various embodiments, a peripheral outline of the top and bottom sides 15 and 16 of the housing H, which is followed by the profile of the sidewalls 17, 18, may feature multiple curves giving the housing H a general figure eight or hourglass-like shape, with a first or front half 50 that has a generally diamond shape configuration and a second or back half 52 that has a generally circular configuration with a narrow mid-section therebetween. For example, in various embodiments, the profile of the sidewalls 17, 18 may each be viewed as having a first segment 19 from the front end 13 to an apex 110 of the first half 50, a second segment 20 from the apex 110 to an apex 112 of the second half 52, and a third segment 21 from the apex 112 to the back end 14. The first segment 19 is generally linear having a length L1 projected onto the longitudinal axis A and is angled about 45 degrees divergent from the front end 13 relative to the longitudinal axis A. The second segment 20 is generally concave having a length L2 projected onto the longitudinal axis A, where L2 is greater than L1, e.g., generally about twice the length of L1. The third segment 21 is curved having a length L3 projected onto the longitudinal axis A and is convergent relative to the longitudinal axis A toward the back end 14.

The overall length of the cutting tool along its longitudinal axis A between the front and back ends 13, 14 ranges between about 3.0 to 5.0 inches and preferably about 4.0 inches. The figure-eight or hourglass configuration provides the cutting tool with an ergonomic housing which allows a user to aptly and comfortably hold and operate the cutting tool in the narrow mid-section between the user's thumb and index finger.

The front end 13, in some embodiments, may include a recessed opening 22 for a light 23 (e.g., a LED light). In various embodiments, the top side 15 may include a switch 24 for activating the light 23. The switch 24 may be raised or protrude above the top side 15 allowing the user to tactilely feel for the switch 24.

In various embodiments, the cutting tool may include levers 31, 32 for operating the cutter blades 12. For example, the cutter blades 12 may operate similarly to blades of a pair of scissors with the user depressing the levers 31, 32 towards the sidewalls 17, 18 to cause the cutter blades 12 to close. The levers 31, 32 may have a concave shape that generally matches the concave shape of the second segment 20 of the sidewalls 17, 18.

Figure 3:
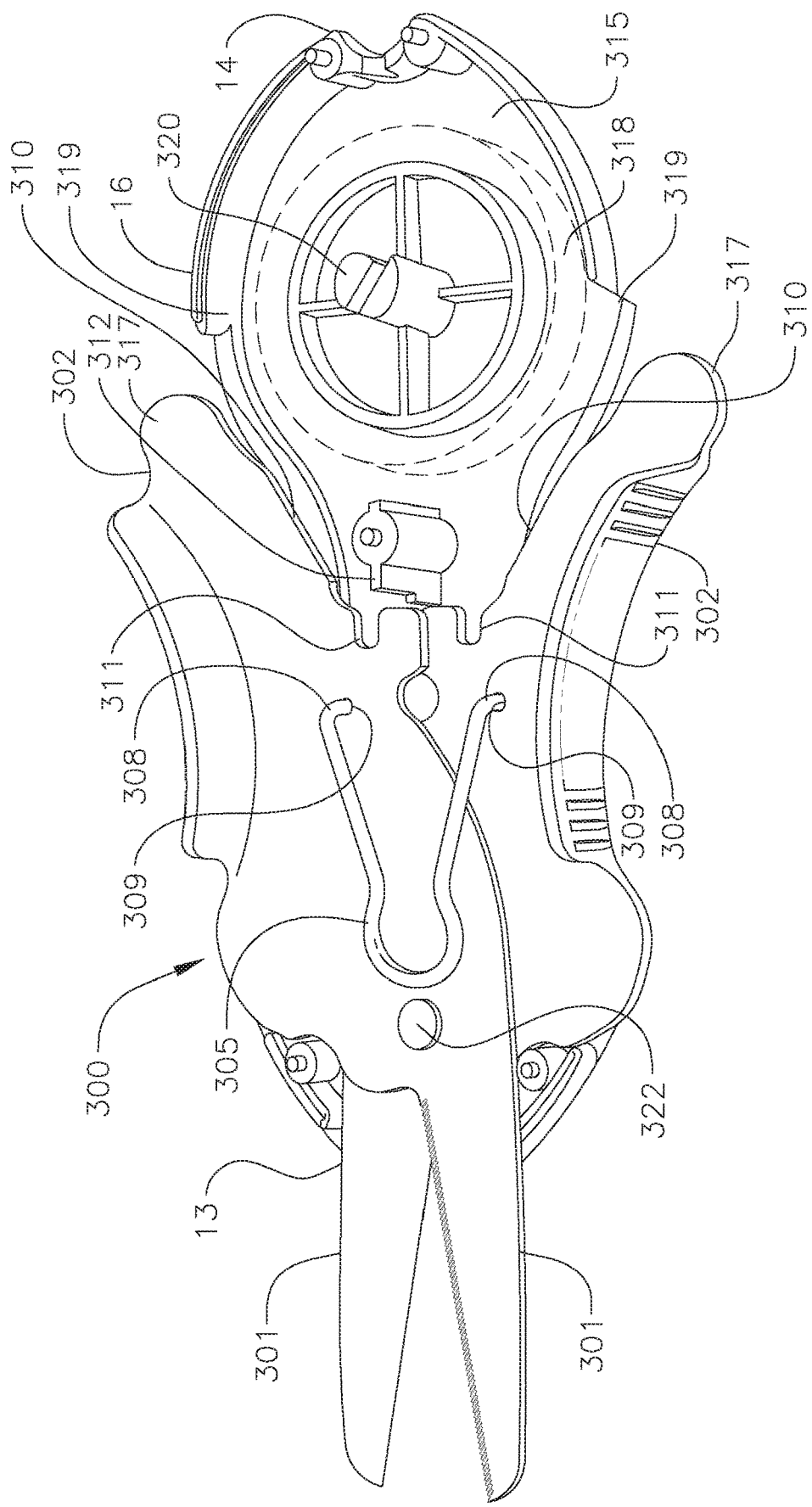
FIG. 3 depicts the internal structure of the cutting tool when the cutter blades are in an open position according to various embodiments of the present invention.
Figure 4:
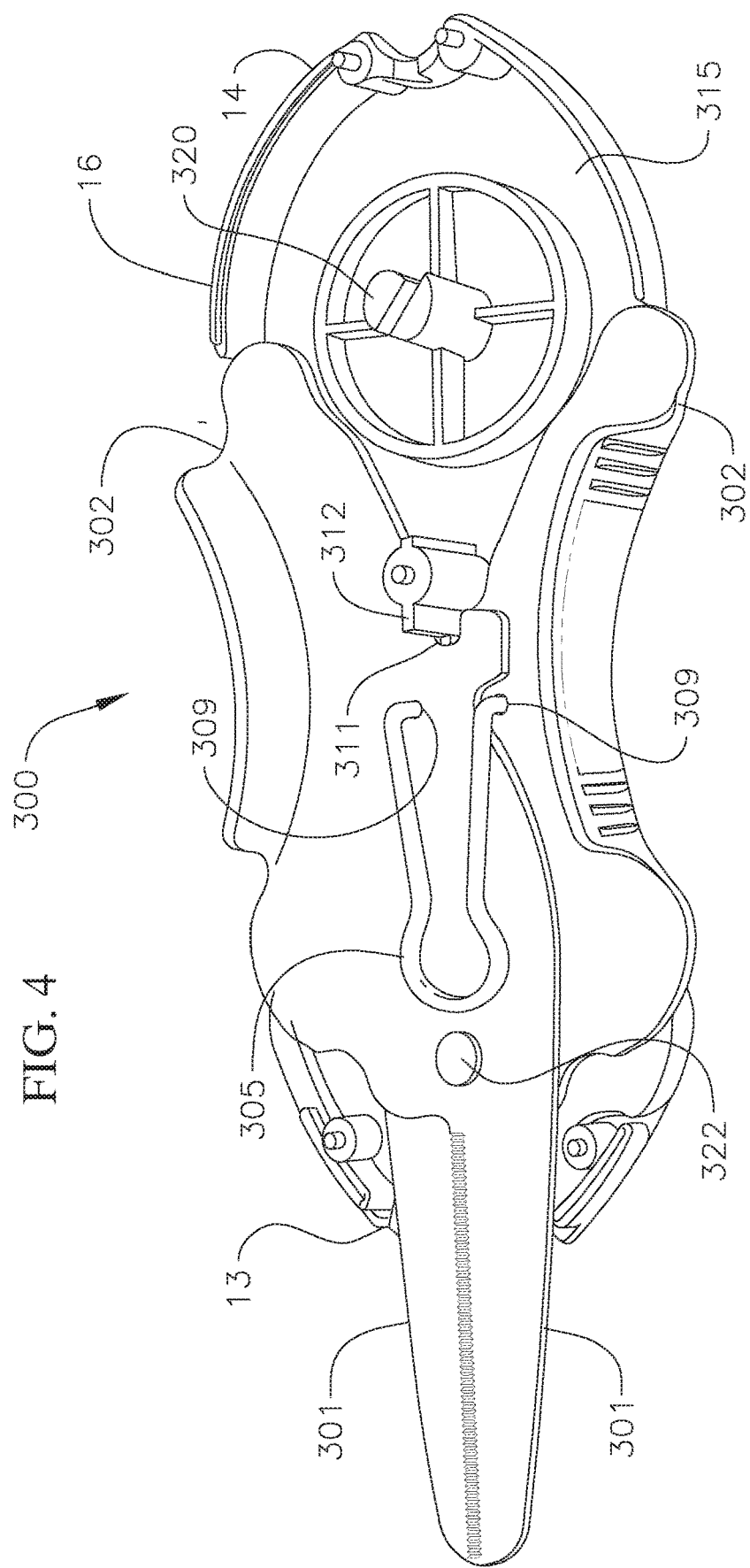
FIG. 4 depicts the internal structure of the cutting tool when the cutter blades are in a closed position according to various embodiments of the present invention.

With reference to FIG. 3 and FIG. 4, the interior of a cutting tool 10 according to one embodiment is shown. Generally encased within the housing H, a pair of cutting members 300 is provided, each being elongated with a cutting blade 301 at a distal end and a pressor lever 302 at a proximal end. The cutting members 300 are pivotally coupled by a pivot pin 322 situated between the cutting blades 301 and the pressor lever 302. A spring member 305 is engaged with each of the cutting members so that the cutting blades are biased toward an open configuration (see FIG. 3). In the illustrated embodiment, the spring member is a preformed wire whose ends 308 are received in a respective aperture 309 in each of pressor levers 302.

Each inner-facing edge 310 of each pressor lever 302 has a longitudinal slot 311 which align with each other when the user presses the pressor levers 302 together to close the cutting blades 301, as shown in FIG. 4. When such alignment occurs, the user can slide the levers 302 (and thus the entirety of the pair of cutting members 300) proximally along the longitudinal axis A so that the slot 311 engages with a ridge 312 that projects vertically from an inner surface 315 of one of the top or bottom side 15, 16 of the housing. Such engagement locks the cutting members in its closed position as a safety feature.

To deploy and open the cutting blades 301, the user depresses the levers 302 and slides the levers (and thus the entirety of the cutting members 300) distally along the longitudinal axis, thus allowing the spring member 305 to bias the cutting blades into the open position. A slotted boss (not shown) is configured on the inner surface 315 of the bottom side 16 which guides the pivot pin 322 in its distal and proximal movement along the longitudinal axis A.

The housing H also houses a reel 318 (shown in broken lines) on which the cable 30 is wound. The reel is mounted on the rod 320 projecting from the inner surface 315 which defines the axis about which the reel rotates in dispensing or retracting the cable 30.

Figures 5, 6:
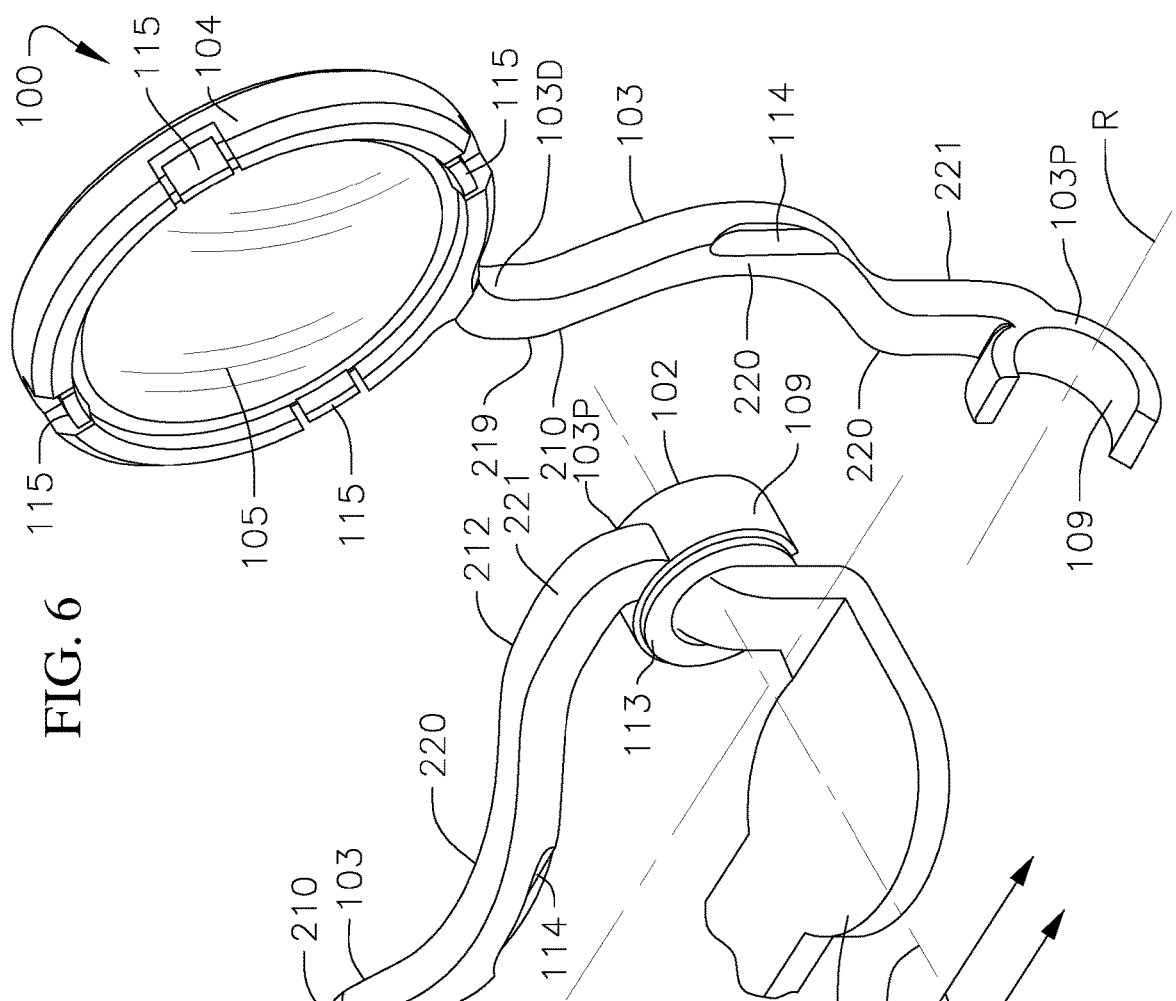
FIG. 5 depicts a magnifier according to various embodiments of the present invention.
FIG. 6 depicts a magnifier according to various embodiments of the present invention.

FIG. 5 and FIG. 6 depict a magnifier 100 according to various embodiments. In various embodiments, the magnifier 100 includes an arm 103 (with a proximal end 103P and a distal end 103D), a hinge 102 at the proximal end 103P, and a magnifying pane holder 104 and a magnifying pane 105 held by the pane holder 104 at the distal end 103D.

Figure 7:
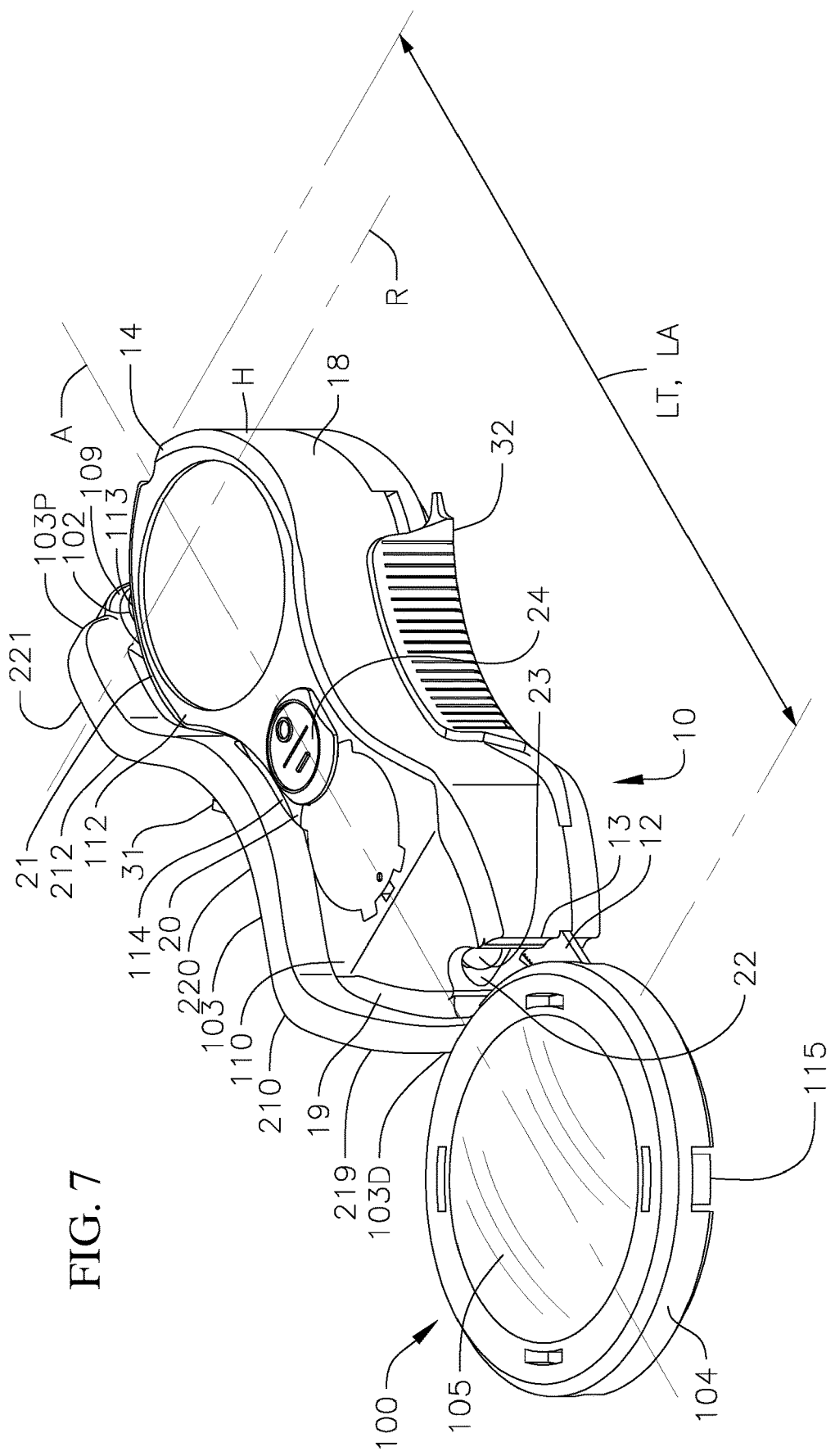
FIG. 7 depicts a magnifier attached to the cutting tool from a side perspective according to various embodiments of the present invention.
Figure 11:
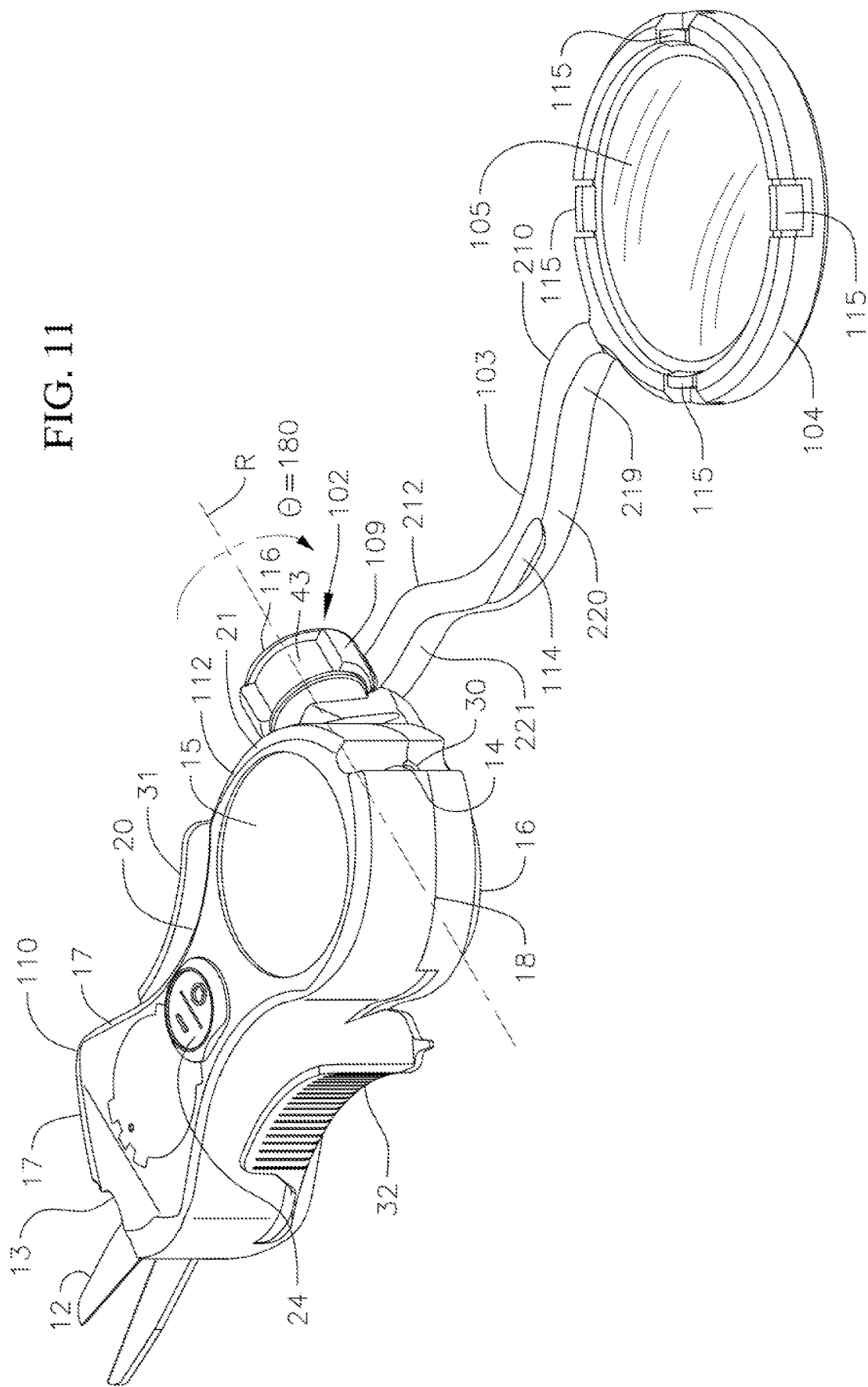
FIG. 11 depicts a magnifier attached to the cutting tool with the magnifier deployed from a side top perspective according to various embodiments of the present invention.
Figure 12:
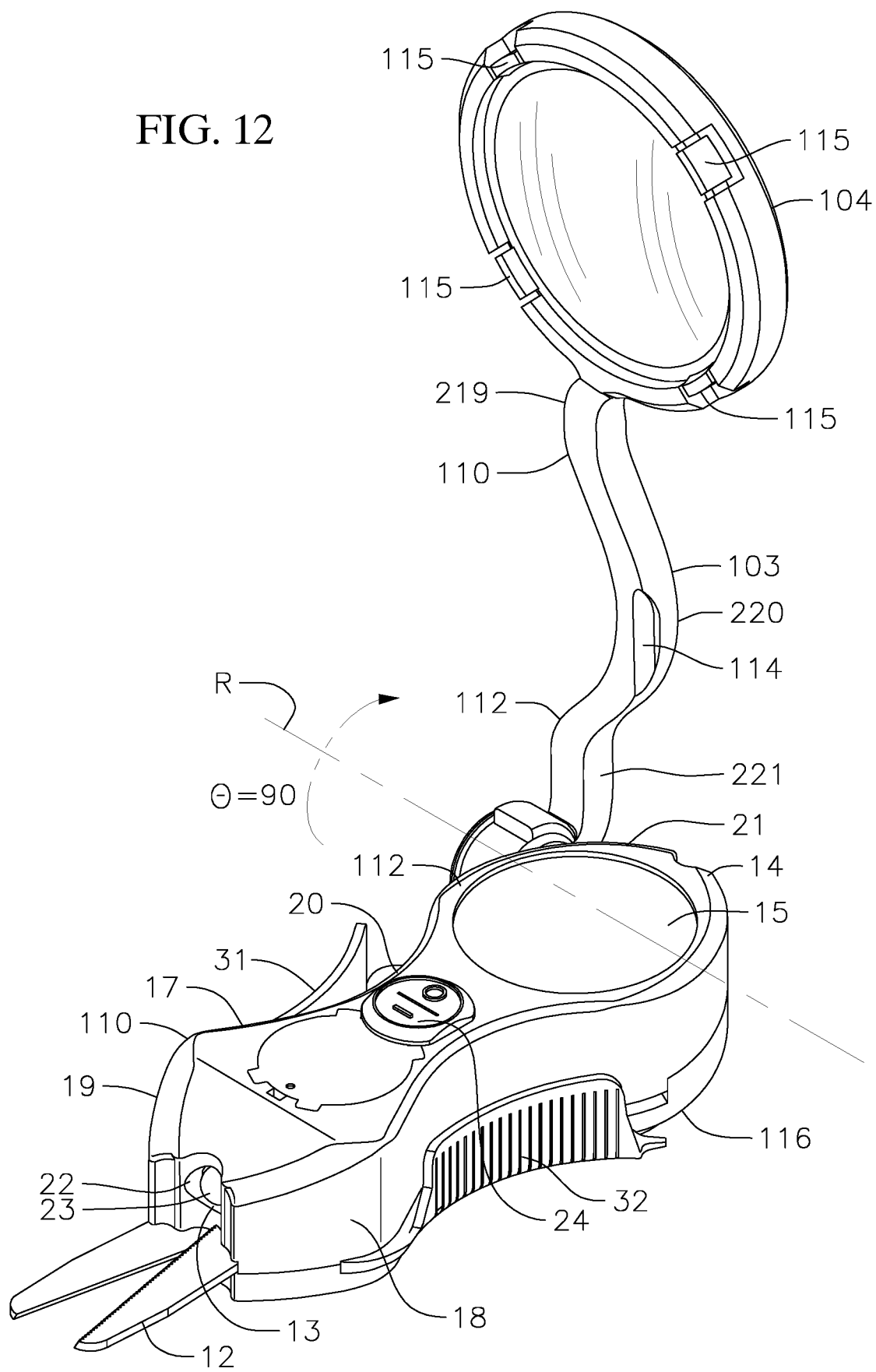
FIG. 12 depicts a magnifier attached to the cutting tool with the magnifier deployed from a side top perspective according to various embodiments of the present invention.

In various embodiments, the magnifier 100 is configured for movable, e.g., pivotal, engagement with the housing H, e.g., one of the sidewalls 17, 18 near the back end 14, between a range of different positions defined by a hinge or pivoting angle θ between the sidewall and the arm, including an adjacent position (θ=0), as shown in FIG. 7, an upright position (θ=90), as shown in FIG. 12, and a fully extended position (θ=180), as shown in FIG. 11. The arm 103 is generally shaped to conform to the profile of the adjacent sidewall (e.g., sidewall 17 in the illustrated embodiments) with the pane holder 104 and magnifying pane 105 located distal or in front of the front end 13. For example, the arm 103 may have a length LA that is greater than or equal to LT and, in various embodiments, the arm 103 has a similar profile as the profile of the adjacent sidewall 17, in having a first or distal segment 219 from its distal end 103D to an apex 210, a second or mid segment 220 from the apex 210 to an apex 212, and a third or proximal segment 221 from the apex 212 to its proximal end. The first segment 219 is generally linear having a length L1' projected onto the longitudinal axis A and is angled about 45 degrees divergent from the distal end 103D relative to the longitudinal axis A. The second segment 220 is generally concave having a length L2' projected onto the longitudinal axis A, where L2' is greater than L1', e.g., generally about twice the length of L1'. The third segment 221 is generally linear having a length L3' projected onto the longitudinal axis A and is generally parallel to the longitudinal axis. In various embodiments, the arm 103 may include a recess or cutout 114 in the second segment 220. The cutout 114 is sized and shaped to prevent the arm 103 from inadvertently contacting and applying pressure to the switch 24 and accidentally activating the light 23.

In various embodiments, the pane holder 104 includes a circular rim defining a circular opening in which the magnifying pane 105 of a circular shape is held and supported by one or more magnifier snap-clips 115. The magnification can be as needed or appropriate. In some embodiments, the magnification is 3×. The magnifier pane may be of any suitable material, e.g., glass, highly polished/clear polycarbonate or acrylic. In some embodiments, the pane holder and the magnifying pane are of a single construction, e.g., formed as a single unit by injection molding.

In various embodiments, the hinge 102 is configured to connect the arm 103 to the housing H, for example, on the sidewall 17, and to allow for the arm 103 to be articulated or pivoted by a user into different positions with the angle θ ranging between at least about 0 and 180 degrees. In various embodiments, the hinge 102 includes a knuckle joint having engagement members, for example, a male member and a female member. In the illustrated embodiment, the proximal end 103P of the arm has the female member, for example, a C-shaped bracket 109, that receives a male member, for example, a pin 113 with a circular cross-section, which allows the arm to have rotational movement defined by the angle θ about an axis R that extends through the pin 113 and generally perpendicular to the longitudinal axis A. The pin 113 may extend directly from the housing H in some embodiments. In other embodiments, the pin 113 is connect to a base 101 that provides a surface that may be affixed to the sidewall 17 or the housing H, for example, by a glue, epoxy, adhesive, double-sided tape, or any other method of attaching the pieces. It is understood that the female and male members may be switched such that the male member is provided at the proximal end 103P of the arm 103 and the female member is provided on the housing H or on the base 101.

In various embodiments, an inner surface of the female member and/or an outer surface of the male member has friction-inducing texture to allow for the arm to be pivoted to selected positions and remain in those selected position. In some embodiments, an inner surface of the female or male member has one or more ridges or detents that engages with recesses formed on the inner surface of the male or female member to releasably lock the angle θ in the position selected by the user. Thus, a user may utilize the arm 103 in a variety of ways to allow for magnification of a desired object without the necessity of holding the arm 103 in place. In the adjacent position of FIG. 7, the magnifying pane is positioned directly over the cutter blades so the user can readily see the cutter blades 12 through the magnifying pane 105. For example, the longitudinal axis A may bisect the cutter blades 12 and the magnifying pane 105. This allows the user to have hands free operation of the magnifier 100 and the ability to tie knots and utilize the cutter 12. In the upright position of FIG. 12 and the fully extended positions, the magnifying pane can be readily placed directly over another object for magnified viewing of the object without obstruction by the housing H.

In various embodiments, the pin 113 may include a pinhead 116 to help maintain the integrity of hinge 102 by helping to keep the C-bracket 109 on the pin 113. However, the hinge 102 may also be a releasable hinge in that the arm 103 may be intentionally detached from the housing H by the user in the event the magnifier is damaged or a second magnifier having a different magnification is desired for attachment to the housing.

Figure 8:
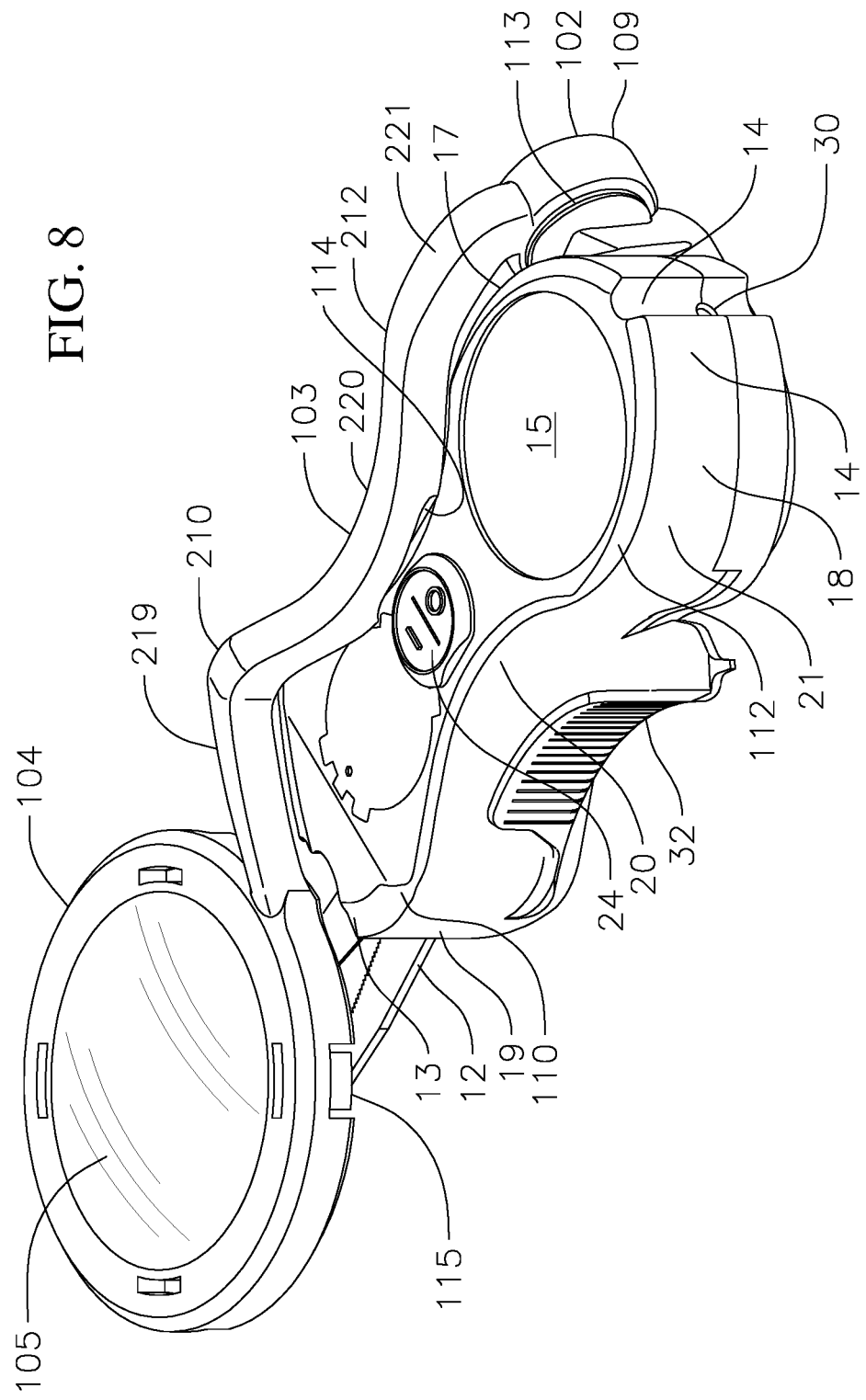
FIG. 8 depicts a magnifier attached to the cutting tool from a side perspective according to various embodiments of the present invention.
Figure 9:
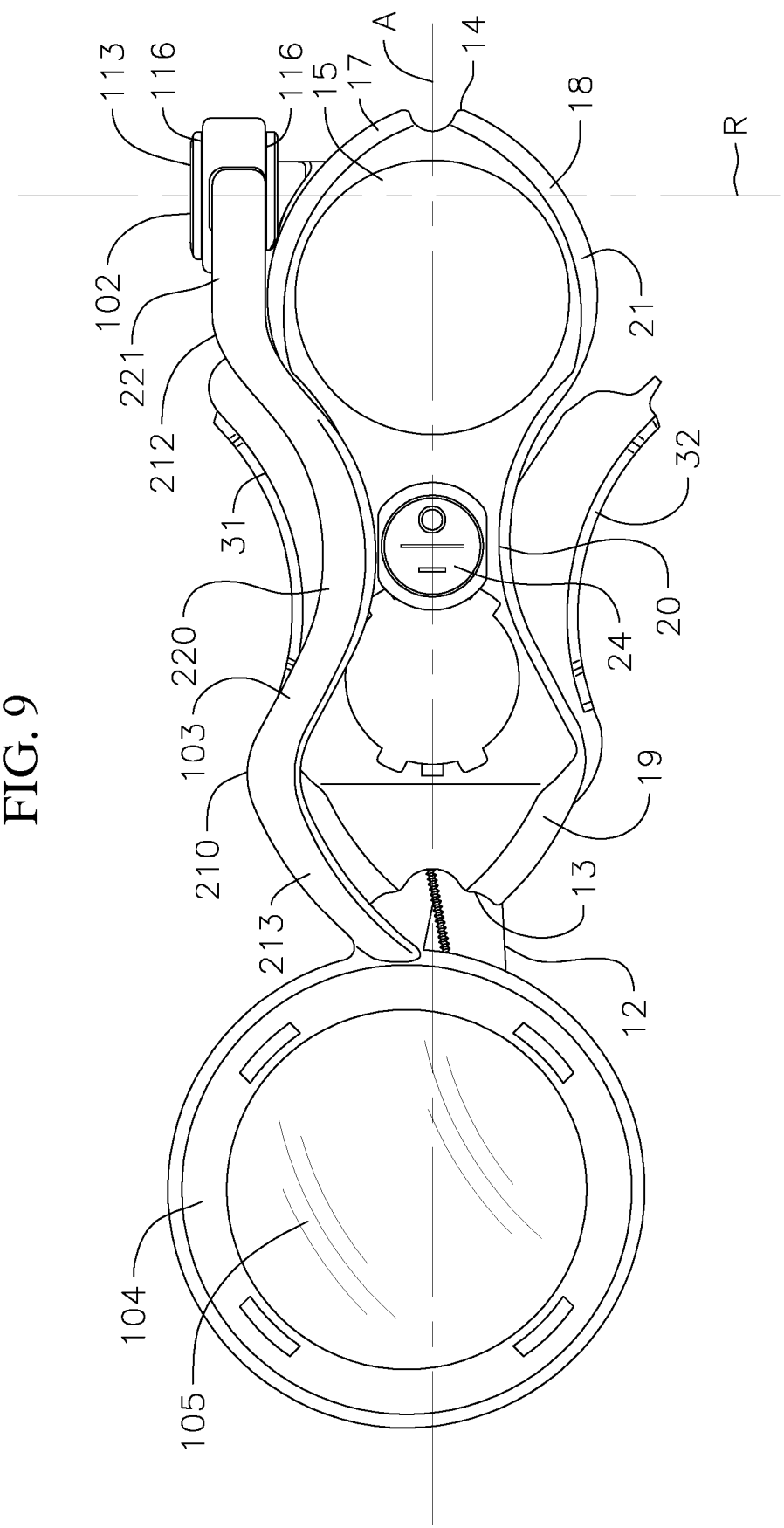
FIG. 9 depicts a magnifier attached to the cutting tool from a top perspective according to various embodiments of the present invention.
Figure 10:
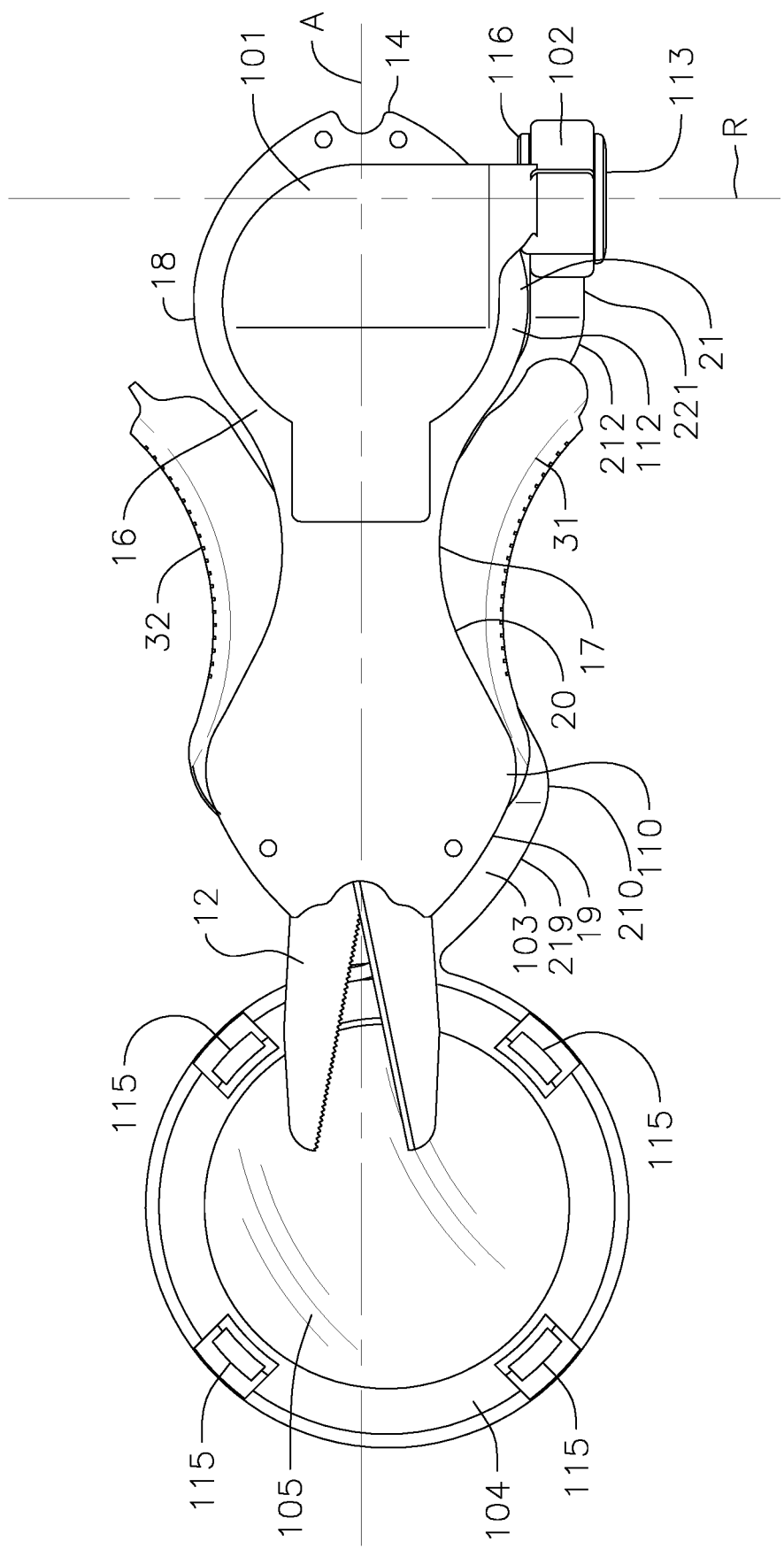
FIG. 10 depicts a magnifier attached to the cutting tool from a bottom perspective according to various embodiments of the present invention.

FIG. 7, FIG. 8, FIG. 9, and FIG. 10 depict the magnifier 100 attached to the cutting tool 10 according to various embodiments. In various embodiments, the arm 103 may be shaped to conform to one of the sidewalls 17, 18 and allow for the use of the cutting tool's 10 features. For example, FIG. 7 and FIG. 8 depict the arm 103 in a "closed" or "non-deployed" position (θ=0). In this position, the arm 103 may rest on the top side 15 of the cutting tool 10 and access to the cutter blades 12, the levers 31, 32, and the switch 24 is unobstructed. Thus, the overall form factor of the cutting tool 10 is maintained, preventing unwanted snags of the tool while allowing for normal usage.

In various embodiments, when the magnifier 100 is a closed position (θ=0), the magnifying pane 105 may be positioned above the cutter blades 12 at the front end 13. In this position, a user may utilize the magnifying pane 105 to facilitate making a precise cut. For example, the magnifying pane may be used to trim portions of a fly, tippet, or to cut excess tippet from a tippet knot. In the closed position, the arm 103 is positioned above the sidewall 17, but it should be understood that a reverse configuration where the magnifier is positioned on the opposite sidewall 18 is possible.

As mentioned above, in various embodiments, the arm 103 may include the first segment 219 with the length L1', the second segment 220 with the length of L2', and the third segment 221 with the third length L3'. In various embodiments, the first segment 219 may connect to the pane holder 104 near the front end 13 above the light 23. For example, in some embodiments, the magnifying pane 105 may be centered along the longitudinal axis A of the housing H.

FIG. 11 and FIG. 12 depict the magnifier 100 in various stages of deployment. For example, the arm 103 may pivot around the axis R. In various embodiments, the arm 103 may be positioned at any location between the closed position as shown in FIG. 7, FIG. 8, FIG. 9, and FIG. 10 (θ=0) and a completely extended position as shown in FIG. 11 (θ=180). For example, FIG. 12 shows the arm Thus, a user may position the arm 103 in a variety of positions to facilitate the viewing and tying of flies and knots.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Moreover, the drawings are not necessarily to scale.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. An improvement to a cutting tool,
wherein the cutting tool comprises:
a handle comprising a first end with a blade assembly and a second end of the handle opposite said first end, and
a locking mechanism to lock the blade assembly in a closed position when not in use;
wherein the improvement comprising:
a base attached to a bottom side of the handle closer to the second end than the first end;
a magnifying pane held a magnifying pane holder, wherein the magnify pane defines a longitudinal axis A that is perpendicular to the optical axis of the magnifying pane;
a hinge attached to the base;
an arm having a proximal end and a distal end, wherein the arm is connected to the magnifying pane holder at the distal end and the hinge at the proximal end, wherein the arm is configured to follow the shape of the handle of the cutting tool, and the arm comprises:
a first arm segment at the distal end and extending from the magnifying pane holder towards the hinge and angled about 45 degrees relative to the longitudinal axis A;
a second arm segment extending from the first arm segment in a concave shape that curves inwards towards the longitudinal axis A; and
a third arm segment extending from the second arm segment and connected to the hinge at the proximal end.

2. The improvement of claim 1, wherein the hinge comprises a knuckle attached to the third arm segment and a pin attached to the base.

3. The improvement of claim 2, wherein the knuckle comprises a C-shaped bracket configured to removably accept the pin.

4. The improvement of claim 1,
wherein the cutting tool further comprises a switch on the handle; and
wherein the improvement further comprising a cutout in the second arm segment to accommodate the switch on the cutting tool.

5. The improvement of claim 1, wherein the magnifying pane holder comprises at least one magnifier clip configured to hold the magnifying pane in the magnifying pane holder.

6. The improvement of claim 1, wherein the magnifying pane is bisected by the longitudinal axis A.

7. The improvement of claim 1, wherein the arm may articulate to different positions with an angle $\theta$ ranging between about 0 and 180 degrees wherein the angle $\theta$ is about 0 degrees when the arm rests on top of a top side of the handle of the cutting tool.

8. The improvement of claim 1, wherein the first arm segment has a length L1 projected onto the longitudinal axis A, the second arm segment has a length L2 projected onto the longitudinal axis A; and the third arm segment has a length L3 projected onto the longitudinal axis A;
and wherein the length L2 is generally about twice the length of L1.

9. The improvement of claim 1, wherein the hinge includes a female member configured for attachment to a male member formed on the base.

10. The improvement of claim 9, wherein the female member includes a C-shaped bracket.

11. The improvement of claim 1, wherein the hinge is configured to provide rotation of the arm about an axis generally perpendicular to the longitudinal axis A.

12. The improvement of claim 1, wherein the hinge includes a male member configured for attachment to a female member formed on the base.

13. The improvement of claim 12, wherein the female member includes a C-shaped bracket.

14. The improvement of claim 13, wherein the male member comprises a pin.

15. The improvement of claim 14, wherein the C-shaped bracket is configured to removably accept the pin.

* * * * *